US012588651B2

(12) United States Patent
Kordecki

(10) Patent No.: US 12,588,651 B2
(45) Date of Patent: Mar. 31, 2026

(54) PET CONTAINER TO OVERLAY A VEHICLE SEAT

(71) Applicant: John R. Kordecki, Arlington Heights, IL (US)

(72) Inventor: John R. Kordecki, Arlington Heights, IL (US)

( * ) Notice: Subject to any disclaimer, the term of this patent is extended or adjusted under 35 U.S.C. 154(b) by 0 days.

(21) Appl. No.: 18/913,325

(22) Filed: Oct. 11, 2024

(65) Prior Publication Data

US 2025/0072388 A1     Mar. 6, 2025

Related U.S. Application Data

(63) Continuation-in-part of application No. 18/458,330, filed on Aug. 30, 2023, now Pat. No. 12,389,876.

(51) Int. Cl.
*A01K 1/02*     (2006.01)
*A01K 1/03*     (2006.01)
*A01K 1/035*    (2006.01)

(52) U.S. Cl.
CPC ........... *A01K 1/0272* (2013.01); *A01K 1/034* (2013.01); *A01K 1/0353* (2013.01)

(58) Field of Classification Search
CPC .................................................... A01K 1/0272
See application file for complete search history.

(56) References Cited

U.S. PATENT DOCUMENTS 2,676,336 A  *  4/1954  Gilmer ................. B60N 2/2854
                                                                5/94
5,479,892 A  *  1/1996  Edwards ................. B60R 21/02
                                                              297/250.1

10,856,519 B2 *  12/2020  Volin ................... A01K 1/0272
2008/0011234 A1 *  1/2008  Wilkes ................... B60R 7/043
                                                                119/28.5
2017/0355348 A1 *  12/2017  Koop ..................... A01K 15/00
2019/0104702 A1 *  4/2019  Edwards .............. A01K 1/0263
2022/0295739 A1 *  9/2022  Yoskowitz ........... A01K 1/0272
2023/0116298 A1 *  4/2023  Florea ................. A01K 1/0272
                                                                224/543

FOREIGN PATENT DOCUMENTS

WO          WO-9406278 A1 *  3/1994  .......... A01K 1/0272

OTHER PUBLICATIONS

Translation of DE_20010028_U1 (Year: 2001).*

* cited by examiner

*Primary Examiner* — Monica L Perry
*Assistant Examiner* — Brittany A Lowery
(74) *Attorney, Agent, or Firm* — Bishop & Diehl, Ltd.

(57)              ABSTRACT

A dog carrier designed to mitigate the effects of kinetosis (i.e., motion sickness) while a dog is traveling in a vehicle. The carrier provides a comfortable defined space that expands a typical passenger seat. The carrier provides a stable rigid base of support to enable a dog to stand, sit, or lay down within the safe confines of the carrier. The carrier can be used in conjunction with a vehicle's LATCH system. An angled base with first and second sidewalls are designed to follow the contour of a standard passenger seat to minimize instability. Cap rails may be used by the canine as a stable place to rest its head while laying down within the carrier. The cap rails may include apertures for placement of small bowls or containers for kibble or water. The carrier may also be used with currently available safety harnesses and/or leashes, if desired.

17 Claims, 13 Drawing Sheets

123

124

PET CONTAINER TO OVERLAY A VEHICLE SEAT

RELATED APPLICATION

The present application is a Continuation-in-part (CIP) of U.S. patent application Ser. No. 18/458,330 filed on Aug. 30, 2023, which claims the filing priority of U.S. Provisional Application No. 63/474,627 titled "A Dog/Pet Platform Container to Overlay a Vehicle's Seat" and filed on Aug. 30, 2022. The '330 Non-Provisional Application and the '627 Provisional Application are both hereby incorporated by reference.

TECHNICAL FIELD OF THE INVENTION

The present invention relates to a portable pet seat or container for vehicular travel. More specifically, the invention relates to a pet carrier which allows the pet to interact with other travelers in the vehicle while remaining safe and comfortable in a semi-confined space.

BACKGROUND OF THE INVENTION

It is often an issue for pet owners to provide a safe, stable area for their pet while traveling. This can be particularly applicable to dogs, and especially larger dogs, as they can be a bit rambunctious during travel. This can present a problem not only for the pet, but also for other passengers within the vehicle, including the driver.

Further, a typical automobile seat is designed to fit a seated human's body and, as a result, does not accommodate a dog's posture very well. To even fit on most car seats, a dog is required to sit sideways. Even when sitting sideways, the cushioning found in a typical car seat may be difficult for a four-legged animal to balance itself as the vehicle moves, especially when the pet is uncontained. Without added stability or security, these conditions can be problematic due to the dog's lack of side-to-side stability when starting and stopping.

Ultimately, if the pet loses balance and falls during vehicle movement, or hits objects or passengers within the vehicle, it may result in damage to the pet, the vehicle, or other passengers. Even without causing damage, the unconstrained pet may become a distraction to the driver, which might also lead to vehicle damage, and/or passenger and pet injury.

Further, it has been reported by numerous sources that 48% of all dogs suffer from a condition called "kinetosis" or more commonly known as "motion sickness." The condition of "motion sickness" covers a number of illnesses, including sea sickness and car sickness. The symptoms of kinetosis in dogs range from mild (e.g., dizziness, cold sweating, headache, irritability, agitation, and loss of appetite) to more severe (e.g., nausea, vomiting, increased salivation, disorientation, and difficulty with vision).

Canines have sensing organs in the middle ear (semicircular canals) that detect changes in motion and the body's position in space (proprioception). When the body moves or changes position, the semicircular canals relay information to the brain, so the canine's body can react and make adjustments in position and balance, to maintain a stable posture. Likewise, the eyes also act as sensing organs for proprioception. Like the semicircular canals, the eyes relay signals to the brain so the body can react and make adjustments in position and balance, to maintain a stable posture. While a dog is looking out the window of a moving vehicle the eyes are telling the brain, the body is moving relative to landscape. But because the body is somewhat still within the vehicle, the semicircular canals are telling the brain the body is moving at a much slower speed relative to the landscape. This is where the problem starts. In cases of car sickness (kinetosis), the sensing organs in the eye, and sensing organs in the semicircular canals send conflicting information to the brain. This causes the dog's body to overreact to even subtle changes in position occurring within a moving vehicle. The dog reacts by becoming agitated and ultimately sick if the situation is not addressed. The situation is exacerbated when the dog is attempting to stabilize itself and view the horizon by attempting to stand or sit on a soft surface (seat) while riding in a vehicle.

The reason canines get car sick is the same reason a human can get car sick. The big difference is in how humans can deal with car sickness, and how dogs try to deal with car sickness. A human can simply sit in the front seat and peer out the front window or keep their eyes on the horizon, even from the back seat. A human will often open a window in an attempt to increase airflow, thus more oxygen to the brain. A dog does not have the same options. Dogs do not have the ability to communicate verbally, and when they are in the process of becoming sick from kinetosis, they will attempt to alert the driver or passenger by becoming agitated. As hard as they try, in an attempt to seek comfort, a dog will often dart side to side, trying to find a solid base in an effort to stabilize its body. Because the seat cushion has padding, it is inherently unstable, and the dog is further thrown off balance.

When a dog stands or sits on a soft surface such as a seat bottom or seat cushion, the canine actually increases the amount of instability by attempting to make postural adjustments with its legs. As the dog shifts on the instable seat, the weight transfer from the legs through the body becomes amplified. This amplification of movement causes more stress and further throws the dog off balance even with minor motion changes of vehicle. A dog will try to fend off the symptoms of car sickness by keeping its eyes on the horizon and increasing airflow much like a human being.

In most passenger vehicles, a medium to large size canines cannot sit properly on its hindlegs and forepaws on a standard seat cushion. The seat cushion is often too short, and too sloped to create a space that will allow the dog to sit, using a normal upright posture. The dog is then forced to attempt to maintain a posture that is neither comfortable nor stable.

There are a number of medications currently utilized to combat the effects of car sickness in dogs. These medications typically come with negative side effects such as lethargy, constipation, and dryness of the mouth, nose, and throat. These side effects experienced by the dog may last considerably longer than the trip itself. Dogs have a "forever memory" for good and bad encounters. Studies show a higher percentage of younger dogs experience motion sickness with a chance to outgrow the physical symptoms as they age. However, the negative mental experiences a dog has earlier in life can remain in its psyche and be a reason why a mature dog may be forever fearful of what could have been a nice car ride.

Dogs need a stable, roomy, comfortable, and safe environment while traveling in a moving vehicle. Currently there exists a number of commercially available pet kennels. Typically, these are fully enclosed kennels with small openings for air movement, a metal wire door, and enclosed top. This was probably the standard for years, especially for short trips to the vet and/or longer trips including airplane travel. This type of kennel design is very restrictive for pets, particularly larger sized dogs. Also, most are designed with only a handle on top for carrying with no means for securing it in a vehicle.

However, there is not a carrier or crate that is specifically designed to reduce motion sickness for a traveling pet. This is because existing carriers and crates fail to provide a rigid base of support that allows the pet to be in a comfortable stable position—whether standing or sitting—within a moving vehicle, with the added benefit of a safety harness, if warranted.

Before the present invention, containment options required pets to be caged or physically restrained during travel by constraints or other devices. These systems prevent or at the very least limit interaction with the pet, which may cause additional stress to the animal. Other devices and systems are designed to strap an animal to the seat using harnesses or the like, but these devices fail to address the seat size issue, especially as it pertains to larger dogs.

Finally, the systems and devices of the prior art are of a single use nature—i.e., they are limited to use as a car seat. The present system is capable of multiple uses, including a car seat, a pet bed, and an enclosed pet kennel, which prevents the need for additional equipment on overnight trips, for example.

Until the invention of the present application, these and other problems in the prior art went either unnoticed or unsolved by those skilled in the art. The present system provides a stable, adjustable, universal dual purpose pet container for a vehicle and a home, with priorities focused on pet safety and comfort.

SUMMARY OF THE INVENTION

There is disclosed herein an improved pet carrier which has multiple uses and avoids the disadvantages of prior devices while affording additional structural and operating advantages.

The pet carrier is useful as both an open carrier and as a fully enclosed kennel. The carrier can be used in a vehicle having at least one passenger seat and a LATCH system within the vehicle. Generally speaking, the carrier comprises a base configured to be positioned directly onto the at least one passenger seat, first and second side walls attached to the base, and a coupling system attached to the base for mechanically securing the pet carrier to at least one lower anchor of the LATCH system. The base includes opposing side edges to define a width and opposing front and rear edges to define a depth, wherein the depth of the base is greater than the depth of the at least one passenger seat such that the base extends past a front edge of the at least one passenger seat when positioned on the at least one passenger seat. Further, the base comprises a first section and a second section, the second section being on an angle relative to the first section.

In specific embodiments, the second section of the base is angled to follow a slope of the at least one passenger seat. Preferably, the angle of the second section relative to the first section is in a range of from 12 to 40 degrees. Most preferably, the angle of the second section relative to the first section is in a range of 20 to 35 degrees.

In other specific embodiments, the coupling system comprises hooks extending from the base. These hooks are configured to connect with lower anchors of the LATCH system to retain the carrier on the passenger seat.

In specific embodiments, at least one of the first and second side walls is movable to provide an access to an interior of the pet carrier. A hinge connecting at least one of the first and second side walls to the base may be used to allow pivoting between a closed position to an open position. At least one of the first and second side walls may be comprised of a first section and a second section, wherein only one of the first section and the second section is movable to provide access to the interior of the pet carrier.

In other specific embodiments, a stabilizing support attached to the base proximate the front edge. The stabilizing support may comprise as least one leg extending opposite of the side walls.

In other specific embodiments, the pet carrier may include a carrier top configured to adjoin to the first and second side walls. Use of the carrier top converts the carrier from the open carrier to a fully enclosed carrier.

The disclosed carrier fulfills the need for a steady, level, solid surface for a dog, or any pet, to sit, lay, or stand on. These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
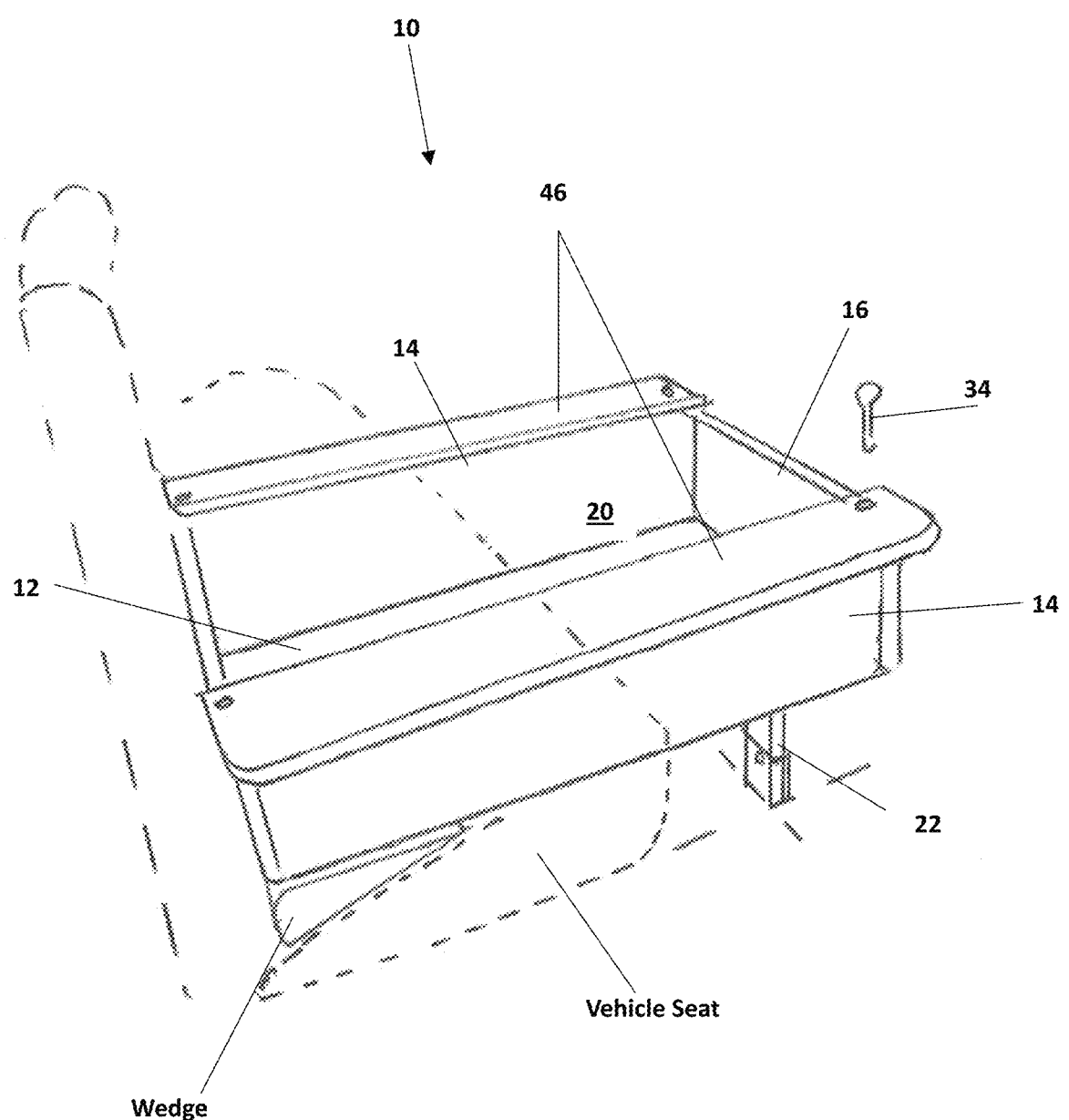
FIG. 1 is a perspective view of an embodiment of the disclosed pet carrier as it is positioned on a vehicle seat.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Embodiment 1

Referring to FIGS. 1-5, there is illustrated at least one embodiment of a pet carrier, generally designated by the numeral 10. The particular illustrated carrier 10 is for a vehicle rear seat. However, while all the embodiments illustrated are directed to a rear bench seat in a car, it should be understood that the principles of the invention can be more broadly applied to use in a truck, SUV, camper, boat, van, and any other similar vehicles.

As can be seen in FIG. 1, an embodiment of the disclosed carrier 10 is comprised of a base 12 and preferably three walls: first and second side walls 14, and end wall 16. The walls, 14 and 16, attach about the periphery of the base 12, and extend upward to define a containment area 20. The containment area 20 can be almost any size to suit or match a particular pet size, but is preferably built for medium, large, and extra-large pets.

The base 12 has a width (measured side to side) and length (measured front to back) and is preferably comprised of a rigid material with a textured, non-slip surface to best accommodate pets during travel and for easy clean-up. The width of the base is preferably in the range of 18 inches to 36 inches, while the length is preferably in the range of 18 inches to 42 inches. Preferably, the base 12 length should extend approximately 7-10 inches beyond the seat edge. Similarly, the side walls 14 and end wall 16 should be of a structurally solid and rigid material. These walls, 14 and 16, should match the relevant dimensions of the base 12 and be at least four inches tall, preferably at least six inches, and for some uses they may be up to 12 inches tall.

A rear wall (not shown) may be used in alternate embodiments but is preferably omitted to provide better positioning of the carrier 10 on a seat, as illustrated in FIG. 1. A stabilizing support 22 is attached to an underside surface of the base 12 and extends downward, in a direction opposite the side walls 14. The stabilizing support 22 is preferably a single leg of adequate dimensions to support the front end of the carrier 10 as it extends beyond the front edge of the car seat, as described above. That is, there should be a significant length of the carrier 10 which is not supported by the car seat. To prevent rocking or tipping of the carrier 10, the stabilizing support 22 must be long enough to reach the vehicle floor. For this reason, the stabilizing support 22 can be extendible to accommodate different seat heights. The support 22 may be made of telescoping sections, a single adjustable leg, or any other suitable method known by those of skill in the art. Further, while a single leg is suitable for most applications, multiple legs may be useful for heavier pets and/or better stability of the carrier 10.

In an alternate embodiment, the base 12 can include a slight downward angle on the extended portion to provide greater headroom for larger dogs. This would still provide a solid surface for the pet to stand, sit, and recline within the carrier, but would accommodate a dog standing forward of the seat edge.

Figure 2:
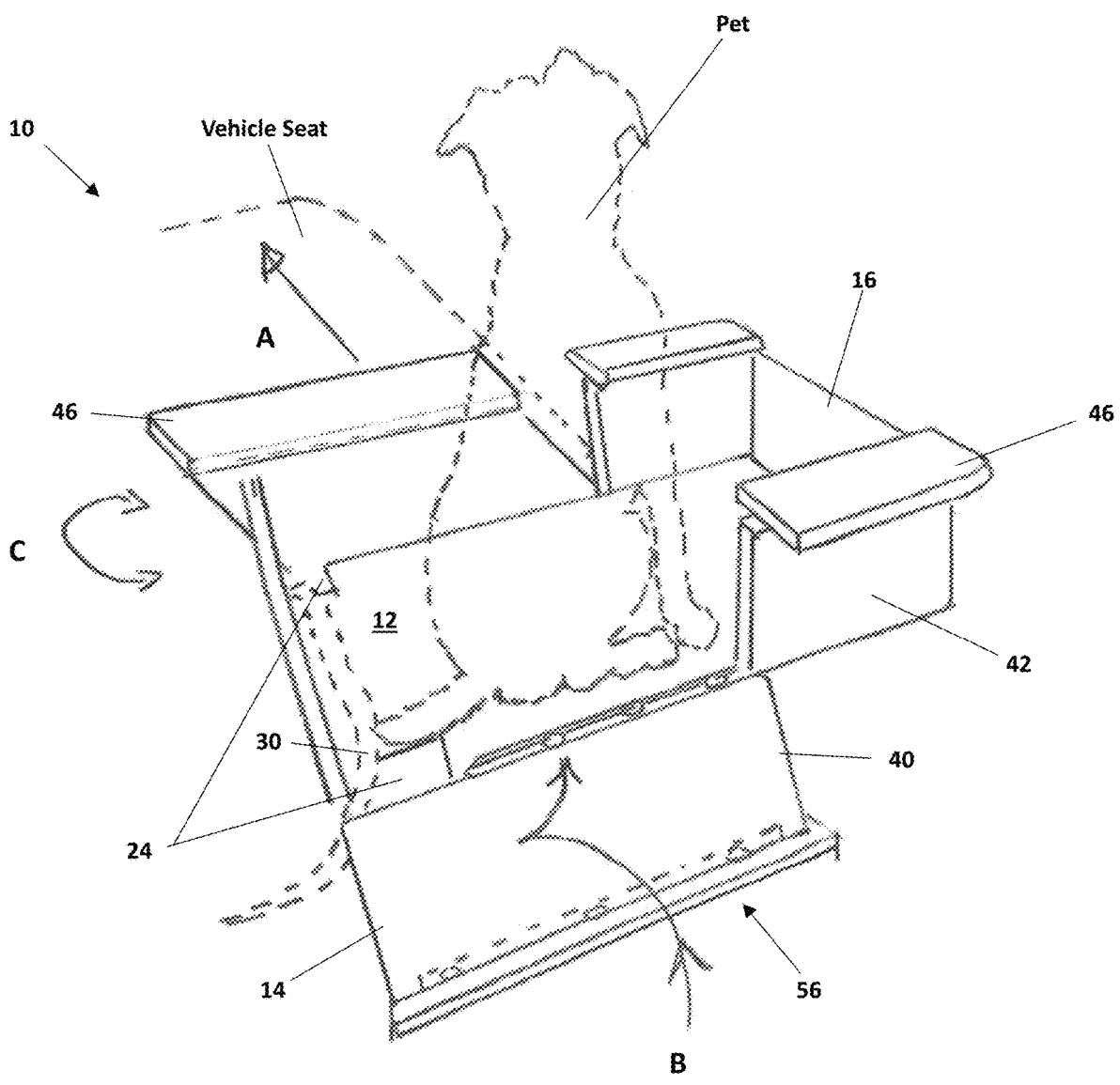
FIG. 2 is a perspective view of another embodiment of the disclosed pet carrier illustrating different features of the system.
Figure 3:
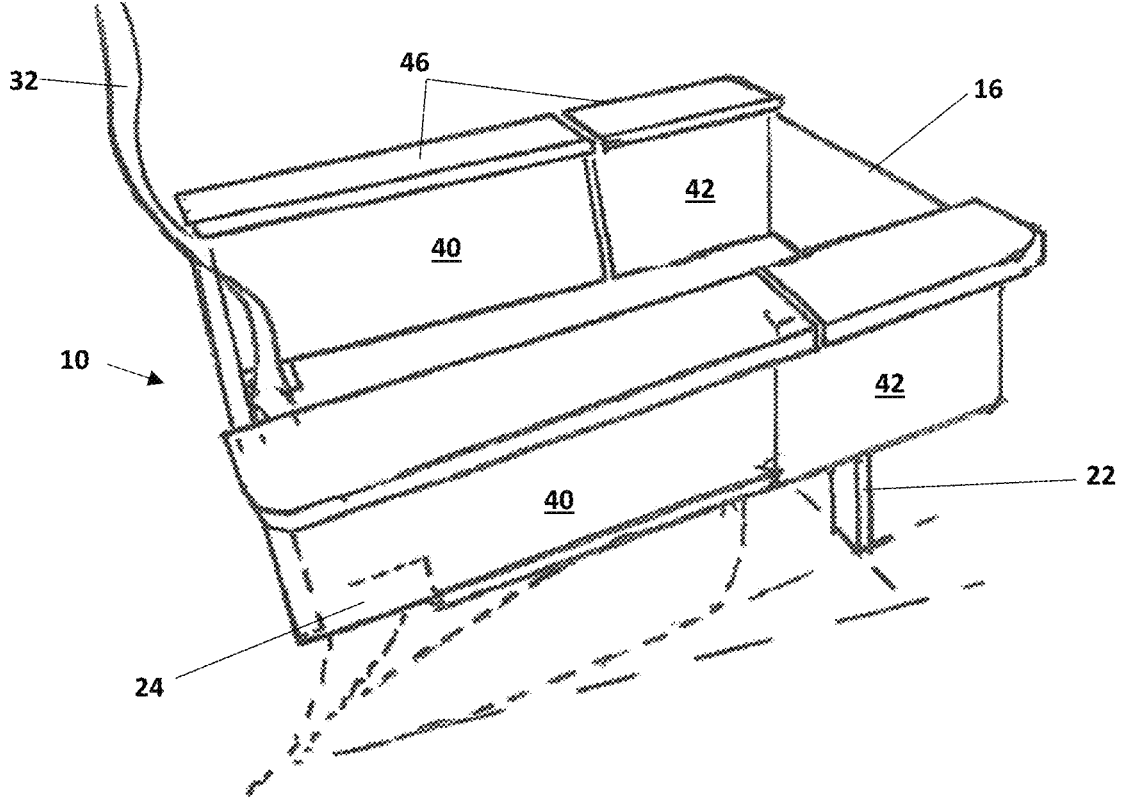
FIG. 3 is a perspective view of the embodiment of FIG. 2 illustrating use of a shoulder strap with the pet carrier.

Referring now to FIG. 2, the base 12 is shown to include two openings 24 at the rear edge. These openings 24 allow a safety belt (or safety harness) 30 to pass through and buckle the carrier 10 to the car seat. A shoulder strap 32 may also be used in securing the carrier 10, as illustrated in FIG. 3. If a back panel is used for the carrier 10, the shoulder strap 32 may secure to the panel in some manner before passing through the opening 24 for coupling with a buckle.

In use, the base 12 should be positioned directly onto the at least one passenger seat of the vehicle. The carrier should be preferably positioned on a back seat but may alternately be placed on a front passenger seat. As previously mentioned, the base 12 has opposing side edges to define a width and opposing front and rear edges to define a depth, with the depth of the base 12 preferably being greater than a depth of the at least one passenger seat. This means that the base 12 will extend past a front edge of the at least one passenger seat when positioned on the passenger seat.

To help stabilize the carrier 10, the stabilizing support 22 is attached to the base 12 proximate the front edge. As previously noted, the stabilizing support 22 is preferably adjustable in length. This allows the stabilizing support 22 to be extended and shortened to accommodate different seat heights. Further, the carrier 10 can be maintained at a slight rearward incline by extending the stabilizing support 22 to elevate the front edge. The incline can be more conducive to providing stability for the pet in the carrier 10.

The first and second side walls 14 attach to the base 12 proximate the opposing side edges of the base and are preferably hinged (see FIG. 2). This allows either (or both) side wall 14 to be moved between an open position—i.e., lowered for easy access and pet entry to the carrier 10—and a closed position. The hinged side wall 14 further allows the space to be expanded by leaving an inside side wall 14 in the down position—e.g., when the vehicle is stopped for any length of time to provide even more room for the pet. While not shown, the side walls 14 may be movable in other ways to create an opening for access, including being removable, slidable, or side hinged to open much like a car door. A locking mechanism 34 should be used to retain the side wall 14 in a closed position during travel. While a locking pin 34 is illustrated, many different locking mechanisms would be suitable for use and are well-known by those of skill in the art.

Figure 4:
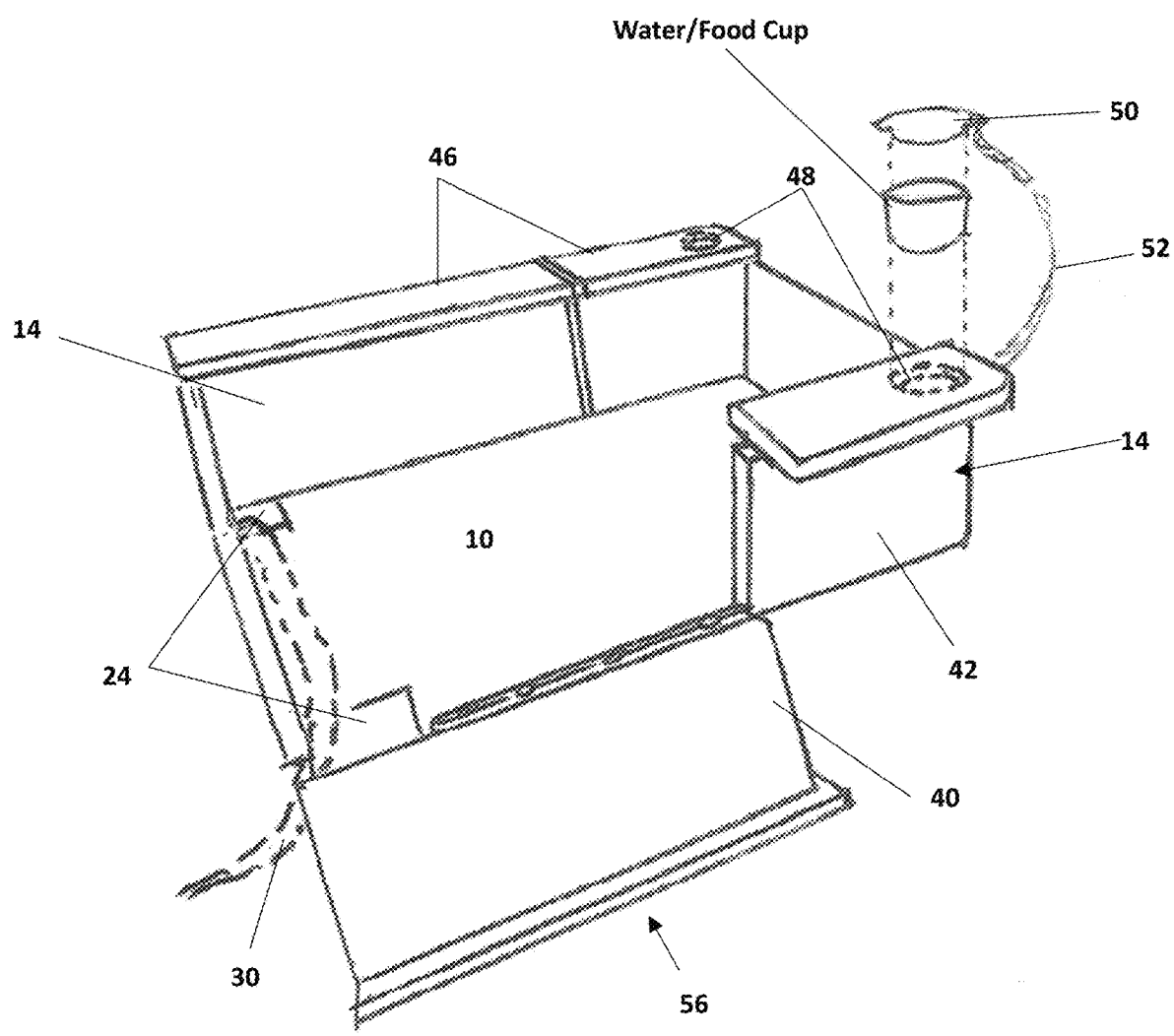
FIG. 4 is a perspective view of another embodiment of the disclosed pet carrier with additional food and water bowl features.

As shown in FIGS. 2-4, the first and second side walls 14 may be divided into a first section 40 and a second section 42, with only one of the two sections, 40 and 42, being movable, preferably hinged to provide access to the interior of the pet carrier 10. As with the full side walls 14, a locking mechanism 44 should be used to retain the hinged section, 40 or 42, in a closed position during travel. Arrow A illustrates access potential by a pet with the ability to fold down hinged section 40, while Arrow B demonstrates the option for a pet to move to another area of the vehicle with hinged section 40 laid flat. These are features which especially accommodate larger dogs. Arrow C indicates the universal fit for the carrier 10, allowing either side to hinge into a ramp or make a flat surface for extra room.

As an alternate feature of the carrier 10, a shelf member 46 may be attached to the upper edge of at least one of the first and second side walls 14. The attachment may be static, or the shelf may be hinged with the capability of locking into position. The shelf member 46 has numerous functions and benefits. For example, it can be used by the confined pet as a place to lay its head during travel.

With the addition of a cup holder-type opening 48, the shelf can also be used to hold water or food, as illustrated in FIG. 4. A cap 50, attached to the side wall 14 by a tether 52, may even be provided to prevent spills during travel. The cap 50 can be fitted to secure over the opening 48 when not being used.

Returning to FIG. 2, the shelf member 46 is illustrated to have an important additional use: as a step. When the carrier 10 is positioned and secured into a vehicle seat, the hinged portion 40 of the side wall 14 can be moved to an open position. In this position the shelf member 46 which extends on both sides of the side wall 14, serves as a small step 56 to be used by the pet to enter the vehicle and the carrier 10. This is a significant advantage, especially for older dogs, timid dogs, large dogs, and even small dogs, to make access to the carrier 10 very easy.

Figure 5:
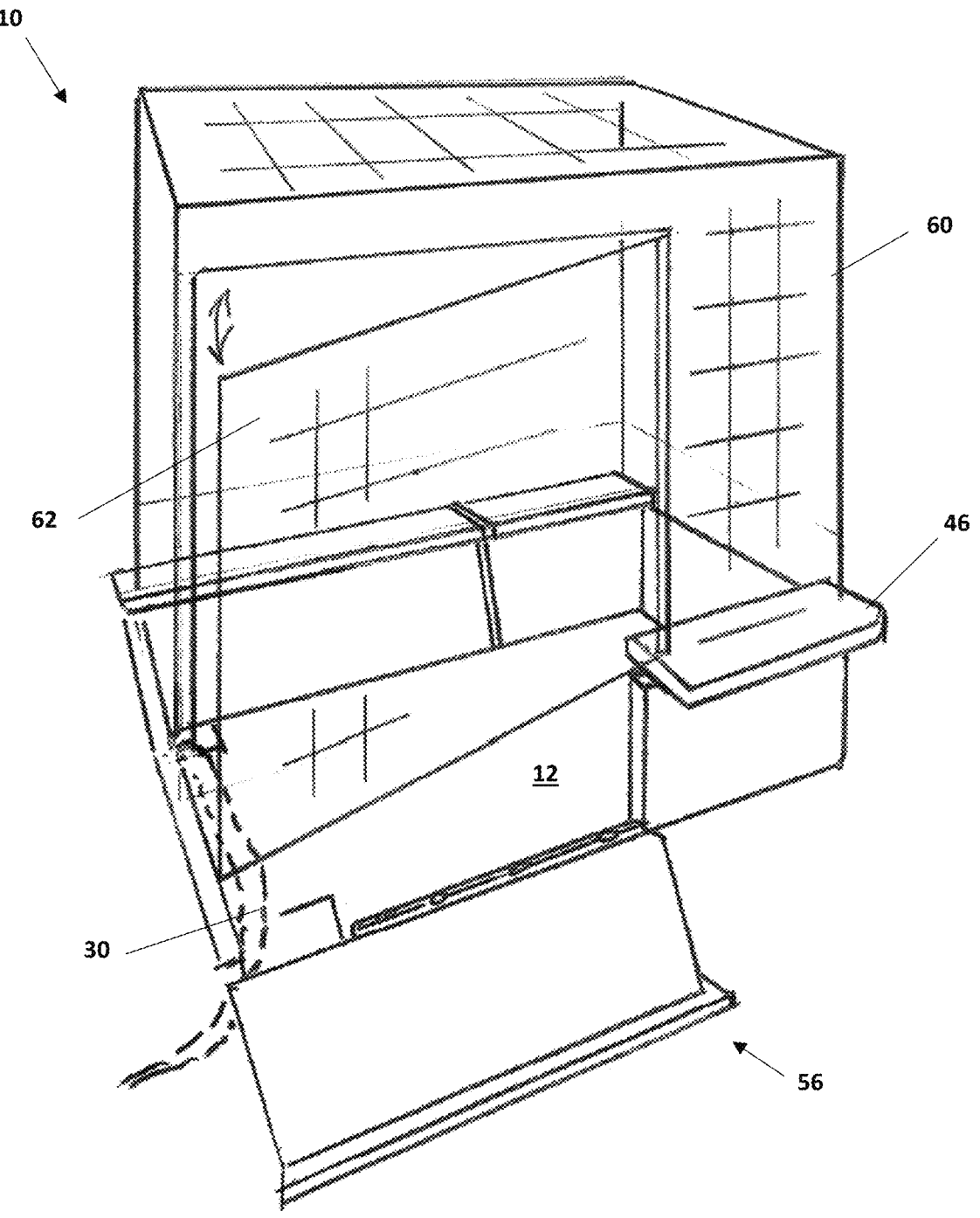
FIG. 5 is a perspective view of an embodiment including an optional kennel top.

Finally, as shown in FIG. 5, the disclosed carrier 10 can double as a pet kennel by adding a top 60 configured to mate with the walls, 14 and 16. The kennel top 60 is preferably made from common materials, such as metal wire, molded plastic, or the like, and preferably includes openings, such as door 62, as necessary. As to mating, the top 60 can be made as simple as just lying on the carrier 10 or it can be connected by means known to those skilled in the art. The top 60 may also be designed to collapse (e.g., fold) for easy storage when not in use. The top 60 can be used on the carrier 10 any time the pet needs to be contained and limit access to the vehicle interior.

Embodiment 2

This embodiment is very similar to that of the embodiment described above, with the addition of some unique features to address other aspects of pet travel. The following describes a dog carrier, referenced by the numeral 210, which is specifically designed to allow the user to transport a dog in a moving vehicle and provide a rigid, stable, defined area to enable a dog to stand or sit comfortably while traveling. The design of the carrier 210 significantly decreases the instability a dog experiences as the vehicle starts, stops, turns, and sways side to side. This is accomplished by providing a stable base of support for a dog's forepaws and hind legs in the standing position, or the dog's hindquarters and forepaws while in a sitting posture. The carrier 210 also allows the dog to be safely transported without being isolated in a standard kennel. The disclosed carrier 210 is designed to be mechanically coupled to the standard LATCH system found on most passenger vehicles manufactured since 2002. Furthermore, the same carrier 210 is designed to be easily moved between vehicles, and even removed from vehicles to be used as a dog bed in the home or other quarters during travel, if the owner so chooses.

Referring to FIGS. 6-17, the second embodiment of the canine carrier 210 is shown. The carrier 210 is specifically designed for use in a rear passenger seat of any number of different motor vehicles. The carrier 210 is also designed to substantially increase the area of a standard passenger seat of a motor vehicle for the pet, as will be explained in more detail below.

Figure 6:
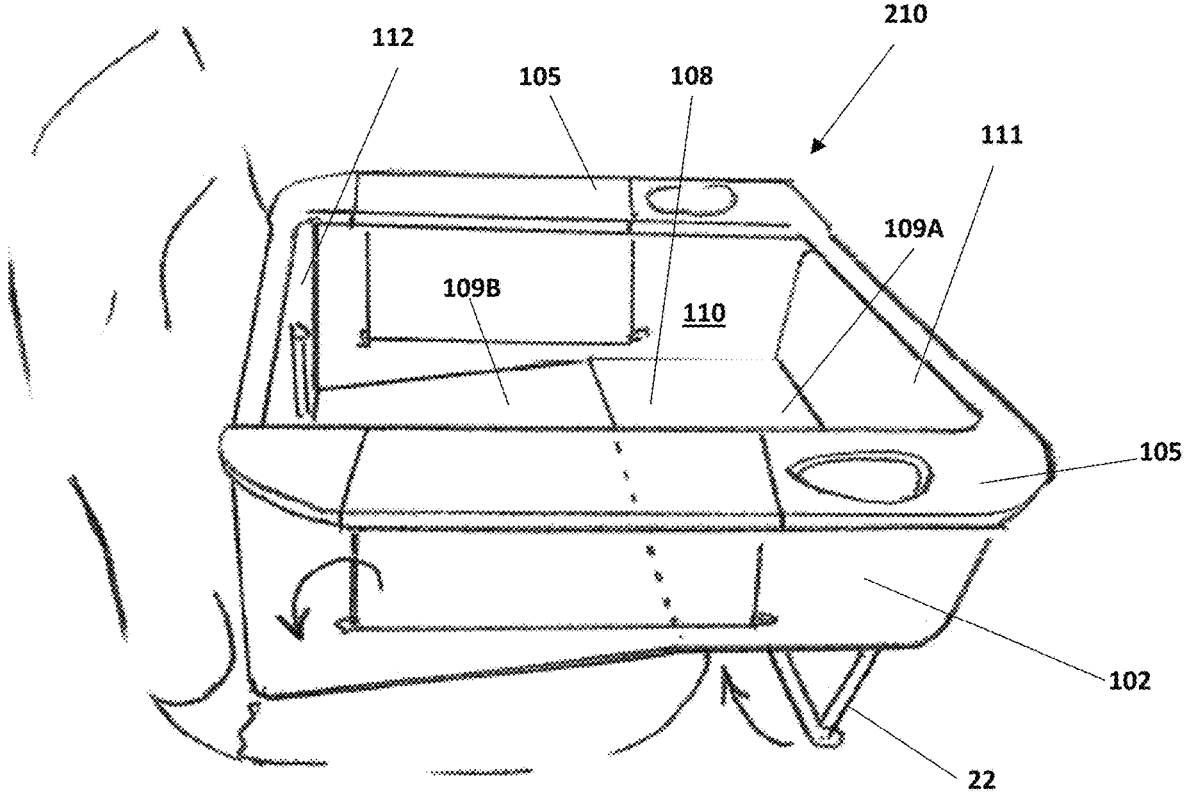
FIG. 6 is a perspective view of another embodiment of the disclosed pet carrier as it is positioned on a vehicle seat.
Figure 7:
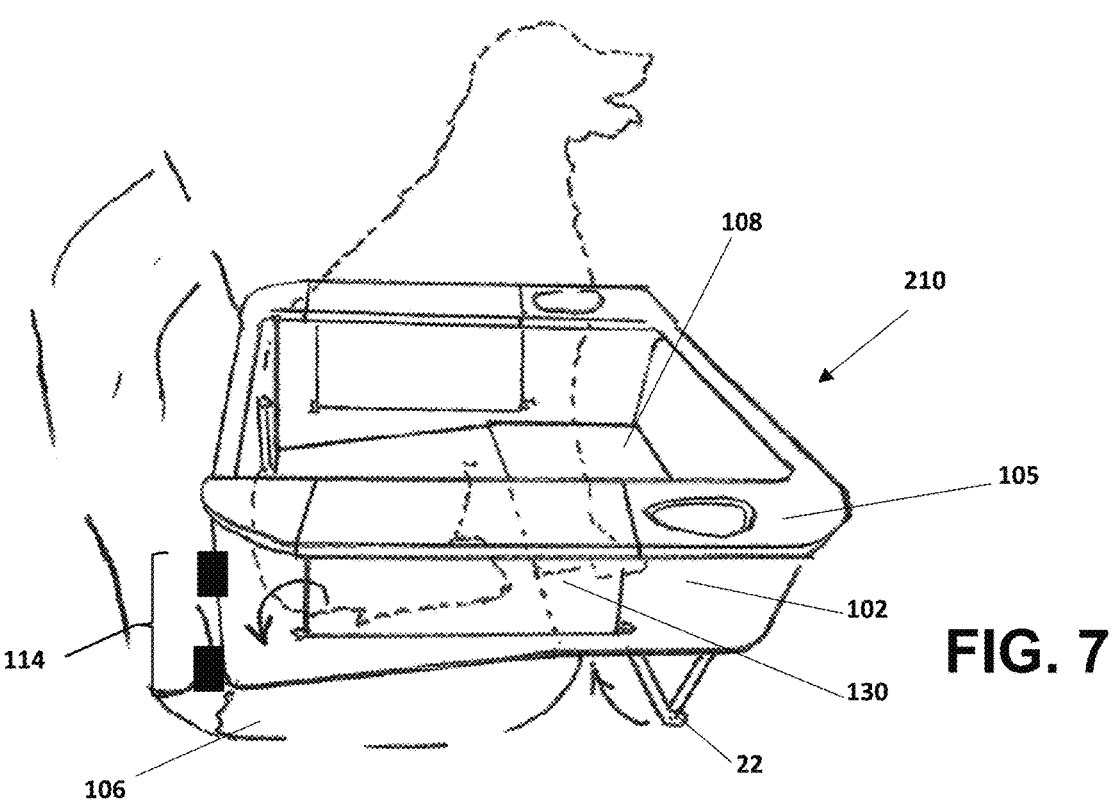
FIG. 7 is a perspective view of the pet carrier of FIG. 6 illustrating a pet in a sitting position within the carrier.
Figure 8:
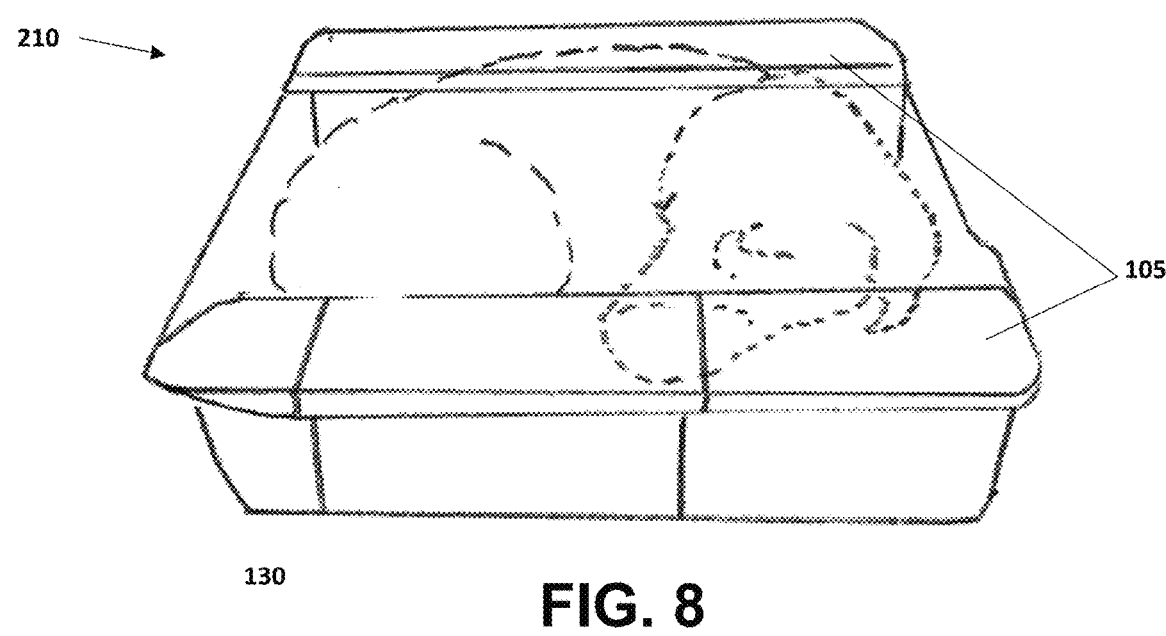
FIG. 8 is a perspective view of the pet carrier of FIG. 6 illustrating a pet in a laying position with the carrier.

As can be seen in FIG. 6-8, the carrier 210 is comprised of parallel side walls 102, a front wall 111, a rear wall 112, and a base 108, all of which define a compartment 110 for a pet. The side walls 102 include cap rails 105 and are specially designed such that when the carrier 210 is affixed to a seat 106 using a mechanical coupling system 104, the cap rails 105 maintain a substantially horizontal position. A rear portion 107 of the side walls 102 are designed to be angled along a bottom edge to create a rearward slope of the base 108, as illustrated. This feature helps stabilize the pet in a rearward portion of the carrier 210.

Some pet owners find that their pet is calmer and less anxious when they have a confined area for at least a portion of the day, whether it is during travel or at home. The present system provides this "safe space" for pets. FIG. 8 illustrates a canine in a recumbent position using the cap rail 105 as support to rest its head while in the carrier 210.

The base 108 of the carrier 210 is preferably constructed of a rigid material, e.g., a hard plastic, metal, or wood, and is comprised of a first (or front) section 109A and a second (or rear) section 109B. As previously noted, the rear or second section 109B of the base 108 within the compartment 110 is angled slightly down rearward relative to the first section 109A. This angle preferably corresponds to a common slope of a passenger seat. The angle is preferably in the range of from about 4 to 20 degrees, more preferably in the range of from 5 to 15 degrees. The desired ratio of first section 109A to second section 109B is in the range of 1:1 to 1:4. One of either the rear wall 112 or the base 108 includes an opening 113 to facilitate a mechanical coupling of the carrier 210 to the LATCH (i.e., Lower Anchors and Tethers for Children) system 114. It is noted that the LATCH system can be slightly different based on the make, model, and year of the vehicle.

Figure 9:
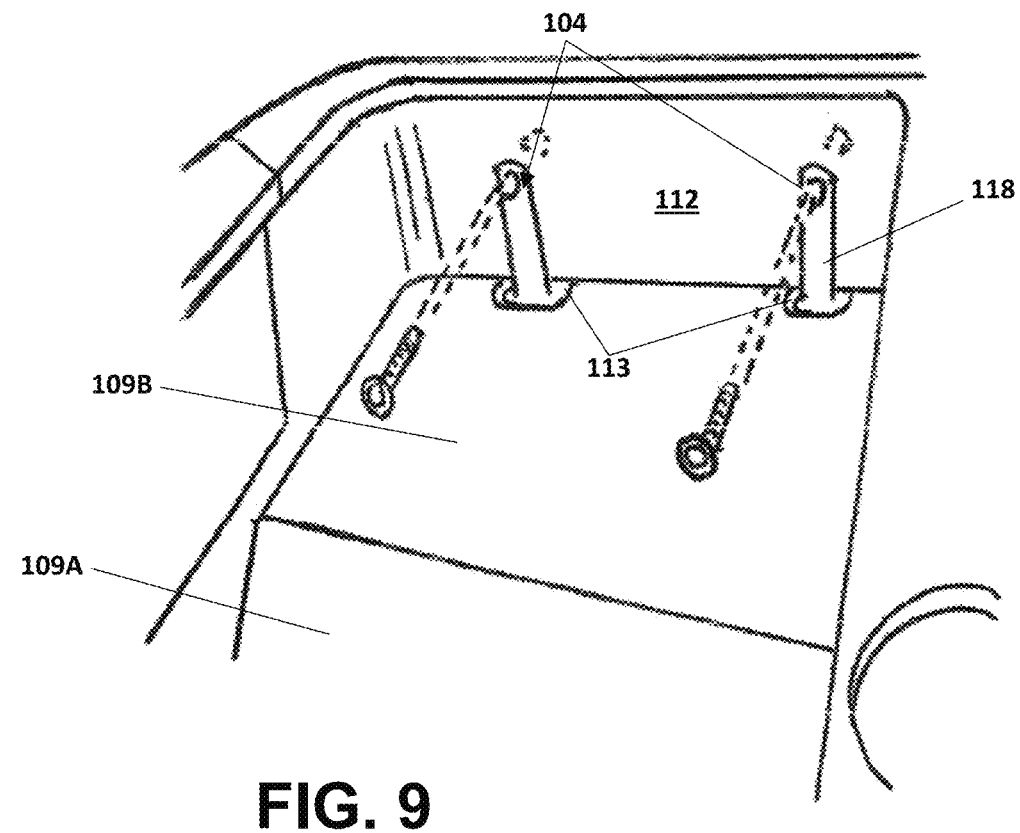
FIG. 9 is a close up view of an embodiment of the disclosed coupling system for a pet carrier.
Figure 10:
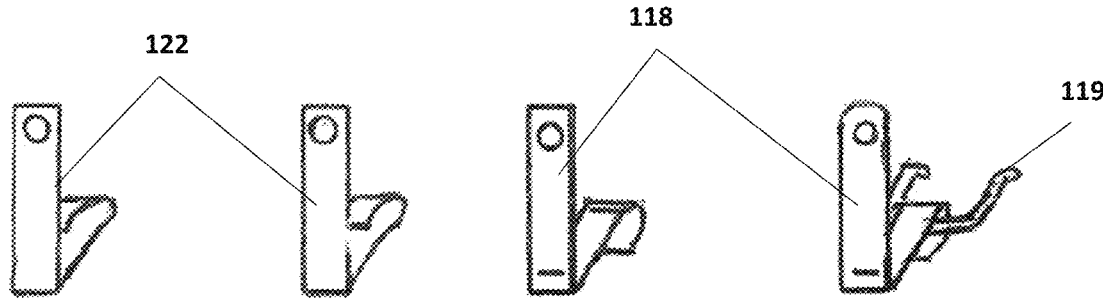
FIG. 10 is a perspective view showing the disclosed coupling system of FIG. 9 engaging a lower anchor of a LATCH system.

The mechanical coupling system 104 may include any of a number of alternate configurations. For example, as shown in FIGS. 9 and 10, one variation of the coupling system 104 uses a flat J-hook 118 that attaches to lower anchors 119 of the LATCH system 114 and enters an opening 113 in the base 108 to connect to the rear wall 112. This provides a secure attachment point of the carrier 210 to the seat 106 of the vehicle. In another variation, referring to FIG. 12, a pair of cinch straps 121 can be passed through the openings 113 on the rear wall 112 and/or rear edge of the base 108. The cinch straps 121 are also passed through lower anchors 119 of the LATCH system 114. Once tightened, the straps 121 will mechanically couple the carrier 210 to the vehicle seat 106.

Figures 11, 12:
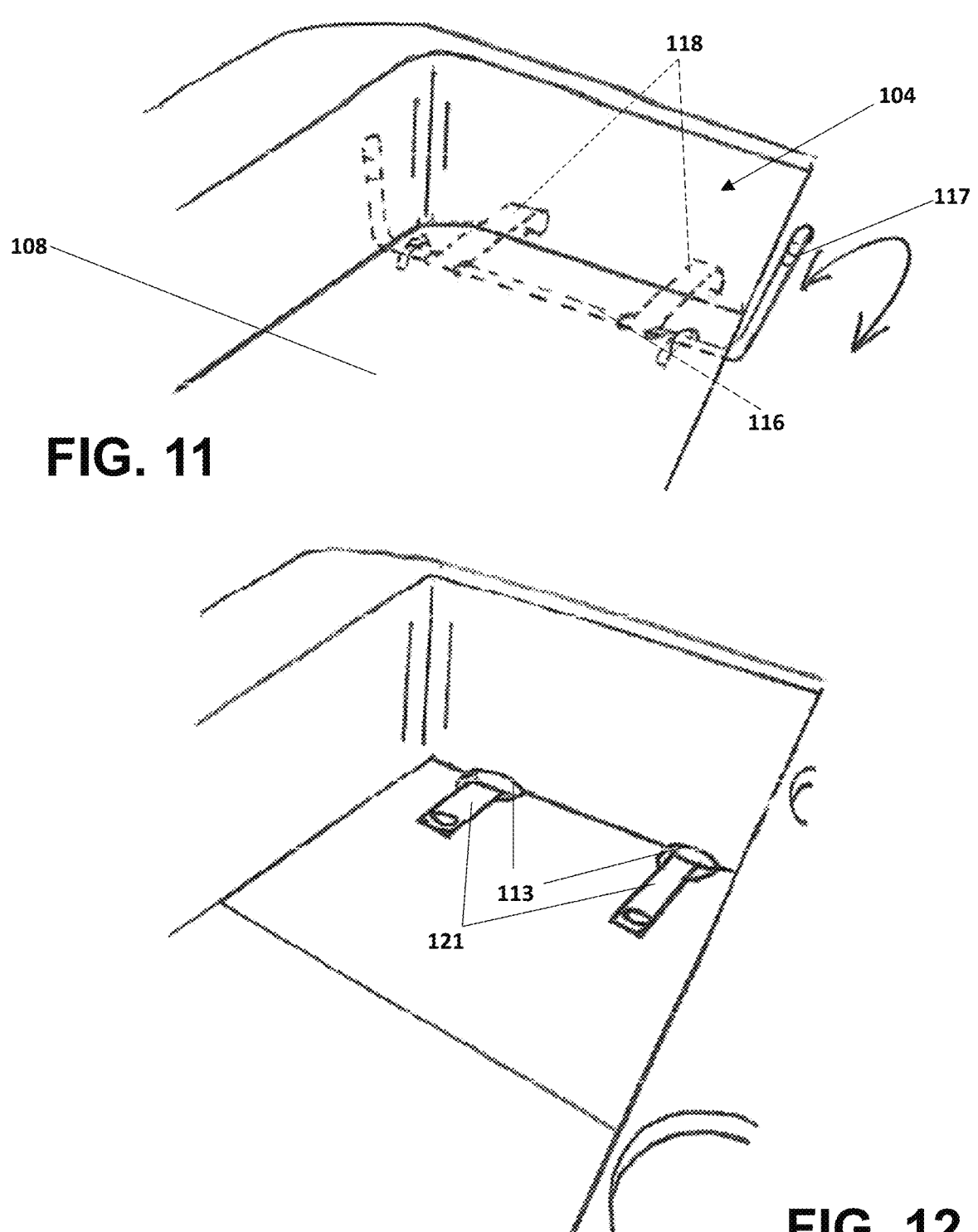
FIG. 11 is a partial view of an embodiment of the pet carrier illustrating an embodiment of the coupling system feature.
FIG. 12 is another partial view of the embodiment of FIG. 11.

FIG. 11 illustrates another variation for the mechanical coupling system 104. This variation includes a long rod 116 secured to the base 18 with at least one handle 117 formed along a sidewall 102. A pair of j-hooks 118 are attached to the rod 116 and spaced apart to correspond to anchors 119 of the LATCH system 114. When the handle(s) 117 is/are rotated to an upward position (i.e., clockwise to 12 o'clock), the J-hooks 118 will be positioned with a slightly downward angle. When the handle(s) 117 is/are rotated to a downward locked position (i.e., counterclockwise to 9 o'clock), the j-hooks 118 rotate upward and engage the lower anchors 119 of the LATCH system 114. This will temporarily couple the carrier 210 to the seat 106 until the handle is rotated back to the upward position.

Figure 13:
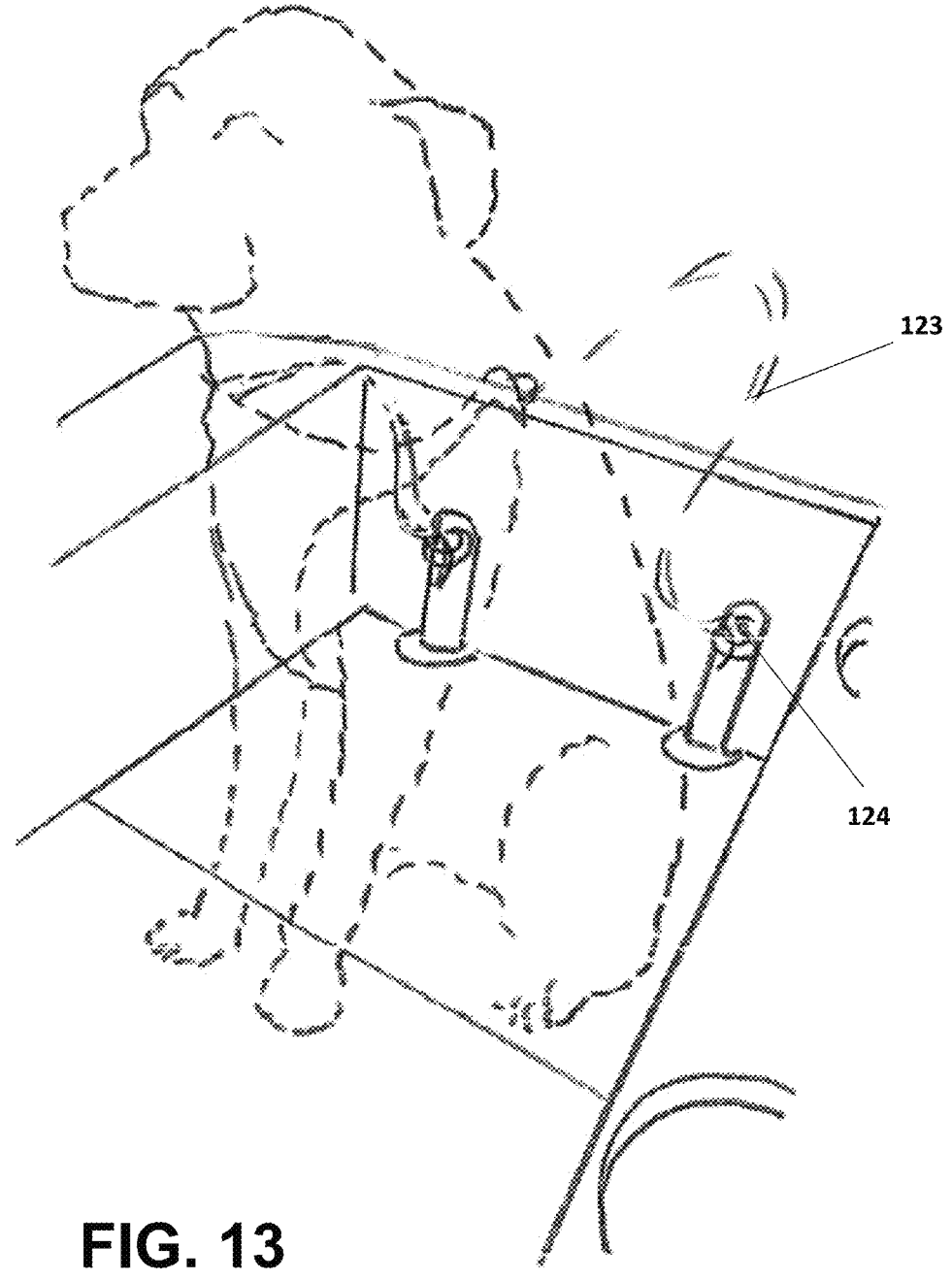
FIG. 13 is a partial view illustrating an embodiment of a restraining feature for the disclosed pet carrier.

FIG. 13 illustrates another optional feature for the carrier 210 that allows the canine to be restrained within the compartment 110. The pet can sit on its hindquarters on the angled base 109 with its forepaws on the flattened front portion of the base 108 while wearing a commercially available restraint harness 123. The carrier is designed so the restraint harness 123 can be coupled directly to the carrier via receivers 124. The receivers 124 are preferably designed to accept a standard snap-hook, but other methods of attachment are possible. Further, the receivers 124 can provide a secure attachment point for not only the harness 123 but also the carrier 210, when coupled to the LATCH system 114 of the vehicle.

Figure 14:
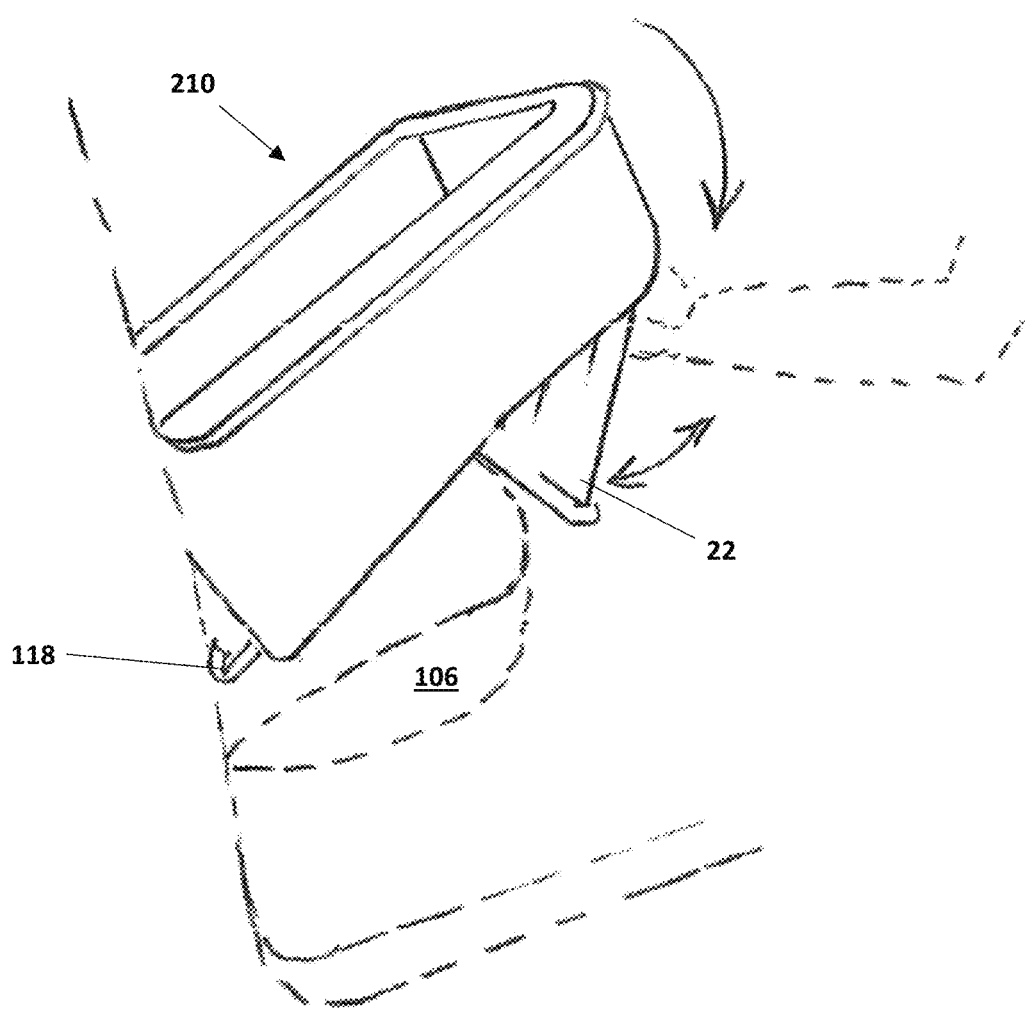
FIG. 14 is a side view illustrating installation of an embodiment of the disclosed pet carrier.

FIG. 14 illustrates still another feature of the coupling system 104. A pair of slightly angled, upward-facing hooks 122 are attached to either the undersurface of the base 108 or the rear wall 112. When the carrier 210 is slid into place with the front end elevated, the upward-facing hooks 122 will line up with the lower anchors 119 on the LATCH system 114. Lowering the carrier 210 downward into place will engage the hooks 122 with anchors 119, effectively coupling the carrier 210 and the LATCH system 114. Simultaneously lowering the front support leg 22 will help support the carrier 210 in this position. To disengage the carrier 210 from the LATCH system 114, the front of the carrier 210 needs to be elevated (approx. 30 degrees to horizontal) as a downward pressure is applied to the base 108 at the rear portion. This will disengage the angled, upward-facing hooks 122 from the anchors 119 of the LATCH system 114 so the carrier 210 can be slid forward and removed from the vehicle.

Figures 15, 16:
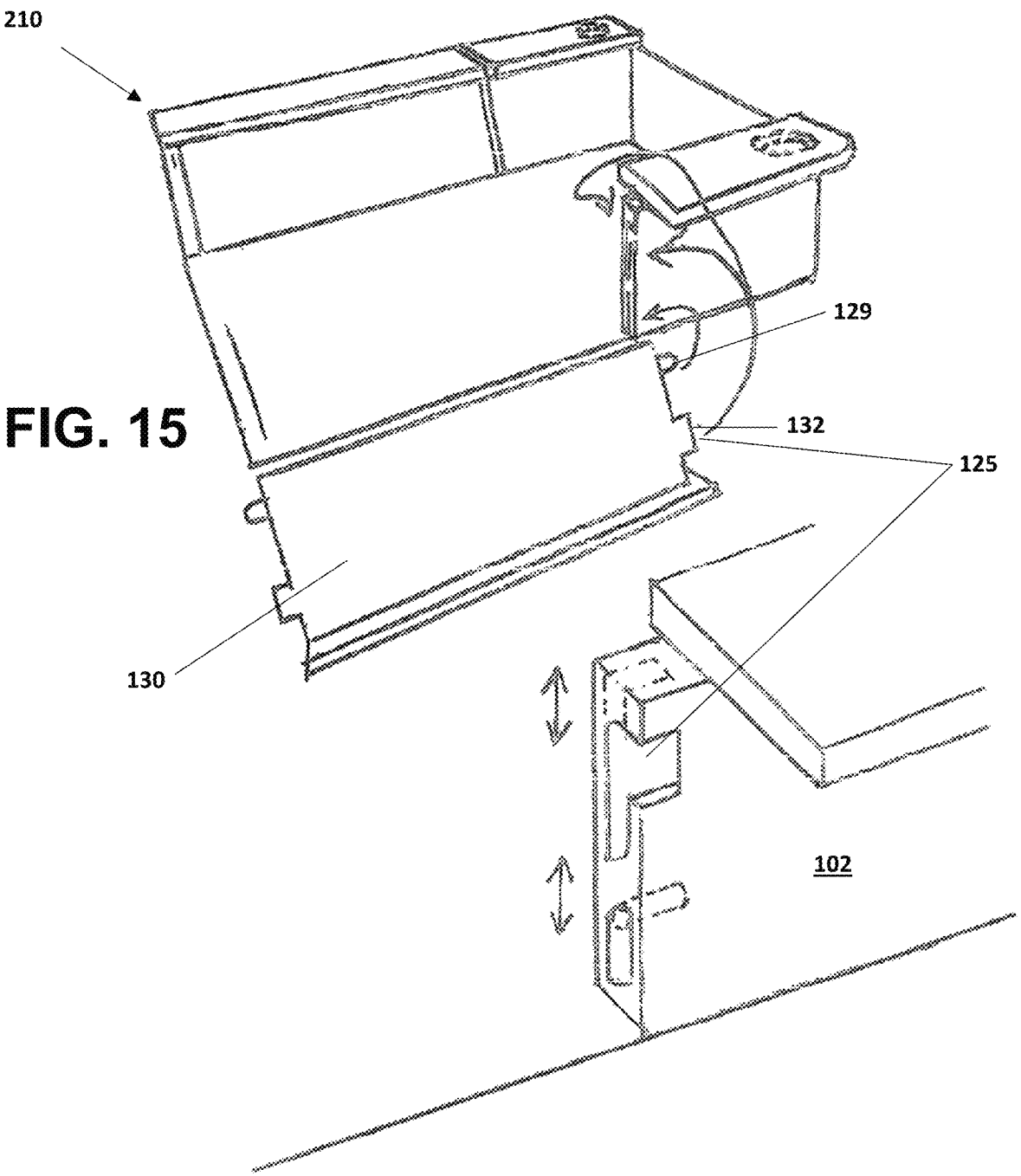
FIG. 15 is a side perspective view of an embodiment of the disclosed pet carrier illustrating side wall opening for ingress and egress of a pet.
FIG. 16 is a close-up view of an embodiment of the latching feature for the pivoting side walls.

FIGS. 15 and 16 illustrate still another feature of the carrier 210. This feature allows at least a portion of one or both of the side walls 102 to pivot downward via hinge 129. This action provides a door 130 for canine ingress to and egress from the carrier 210. When the door 130 of the side wall 102 is in an open position, an inner portion of the cap rail 105 can serve as a step to facilitate entry to and exit from the compartment 110. There are a number of variations and alternatives to the preferred hinge 129 on the side panel 102 to provide a door 130, as would be well-known in the art. Further, FIG. 16 shows a locking feature 125 to keep the door 130 in a closed position. The illustrated feature uses a tongue and groove-type configuration within the side wall 102 as a locking mechanism 132 for the door 130. This feature prevents the door 130 from being accidentally opened by simply pushing outward from the inside of the compartment 110, as a dog might inadvertently do. The illustrated mechanism requires lifting the side wall 102 before rotating downward to open. Preferably, the carrier 210 includes a door 130 on both the right and left side walls 102 to enable a user to place the carrier 210 on either side of a vehicle.

Figure 17:
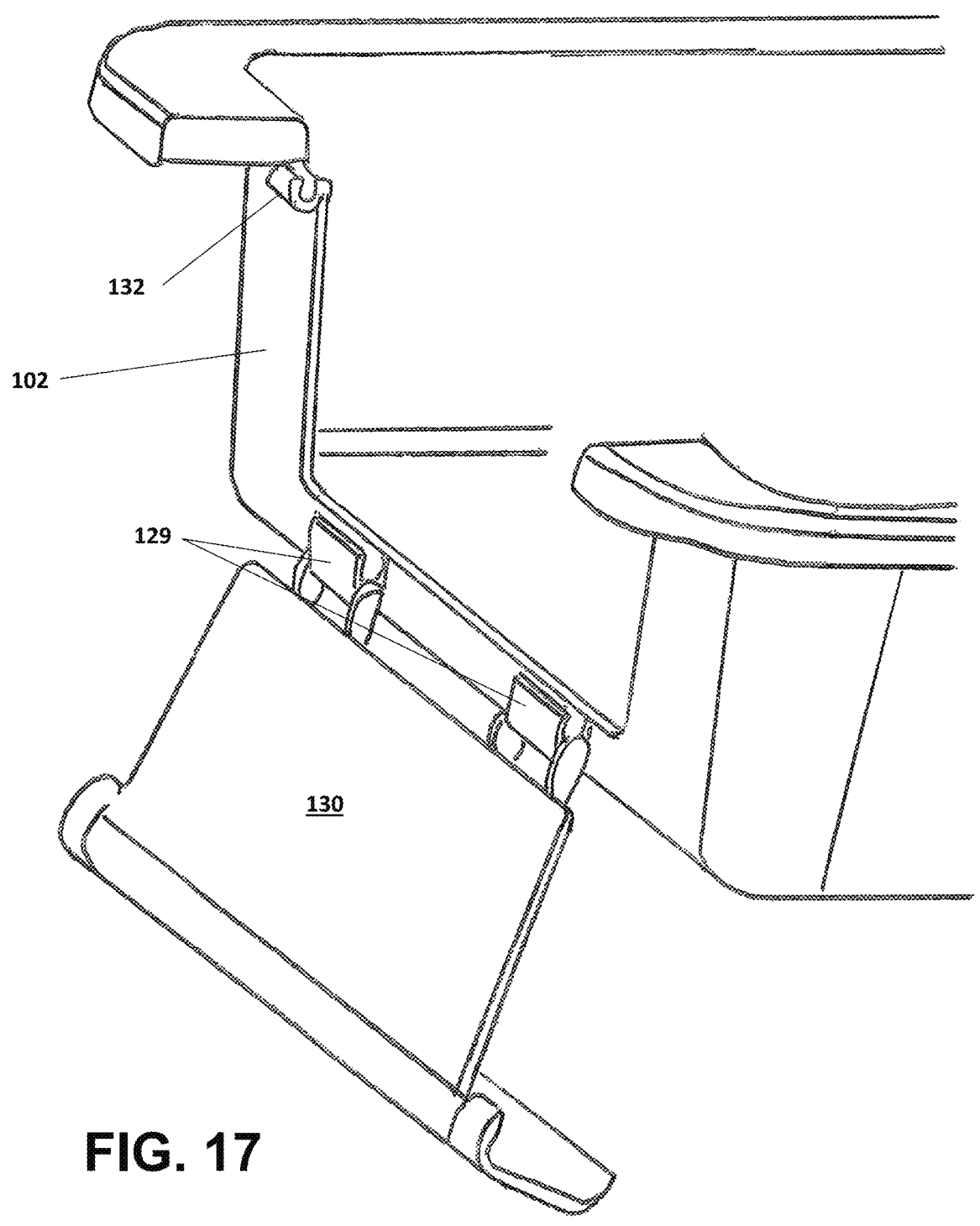
FIG. 17 is a partial view of another embodiment of a hinged and latched door for ingress and egress of a pet.

FIG. 17 illustrates a variation on the hinged door 130 of side wall 102. In this embodiment the hinge 129 and locking mechanism 132 are mounted to the exterior of side wall 102. This configuration also requires a user to lift the door 130 to effect opening.

Numerous modifications to the present disclosure will be apparent to those skilled in the art in view of the foregoing description. Preferred embodiments of this disclosure are described herein, including the best mode known to the inventors for carrying out the invention. It should be understood that the illustrated embodiments are exemplary only and should not be taken as limiting the scope of the disclosure.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A pet carrier for a vehicle having at least one passenger seat and a LATCH system within the vehicle, the carrier comprising:

a base configured to be positioned directly onto the at least one passenger seat, the base having opposing side edges to define a width and opposing front and rear edges to define a depth, wherein the depth of the base is greater than a depth of the at least one passenger seat such that the base extends past a front edge of the at least one passenger seat when positioned on the at least one passenger seat, wherein the base comprises a first section and a second section, the second section being on an angle relative to the first section, and wherein the base comprises two openings spaced a distance apart and proximate the rear edge;

a front wall attached to the base proximate the front edge;

a rear wall attached to the base proximate the rear edge;

first and second side walls attached to the base proximate the opposing side edges of the base; and a coupling system attachable to the base for mechanically securing the pet carrier, the coupling system comprising first and second rigid bars each having a body section, a curved hook portion at a first end of the body section, and a mounting portion at a second end of the body section angled relative to the curved hook, wherein the angled portion of each rigid bar is configured to pass through one of the two openings of the base to be attached to an interior surface of the carrier and the curved hook portion is configured to engage at least one lower anchor of the LATCH system.

2. The pet carrier as set forth in claim 1, wherein the second section of the base is angled to follow a slope of the at least one passenger seat.

3. The pet carrier as set forth in claim 1, wherein the angle of the second section relative to the first section is in a range of from 4 to 20 degrees.

4. The pet carrier as set forth in claim 3, wherein the angle of the second section relative to the first section is in a range of 5 to 15 degrees.

5. The pet carrier as set forth in claim 1, wherein a ratio of an area of the first section to an area of the second section is in the range of from 1:1 to 1:4.

6. The pet carrier as set forth in claim 1, further comprising a movable door to provide an access to an interior of the pet carrier.

7. The pet carrier as set forth in claim 6, wherein the movable door is attached to the base via a hinge.

8. The pet carrier as set forth in claim 6, wherein the movable door is comprised of at least a portion of at least one of either the first side wall and the second side wall.

9. The pet carrier as set forth in claim 1, further comprising a stabilizing support attached to the base proximate the front edge.

10. The pet carrier as set forth in claim 9, wherein the stabilizing support comprises as least one leg extending opposite of the side walls.

11. The pet carrier as set forth in claim 6, further comprising a locking mechanism to retain the movable door in a closed position.

12. The pet carrier as set forth in claim 8, further comprising a locking mechanism to retain the movable door in a closed position.

13. The pet carrier as set forth in claim 7, wherein at least one of the first and second side walls is comprised of a first section and a second section, wherein only one of the first section and the second section is connected by the hinge to the base.

14. The pet carrier as set forth in claim 13, further comprising a locking mechanism to retain the hinged section in a closed position.

15. The pet carrier as set forth in claim 1, further comprising a shelf member attached to at least one of the first side wall and the second side wall.

16. The pet carrier as set forth in claim 13, further comprising a cap rail attached to an upper edge of the hinged section.

17. The pet carrier as set forth in claim 16, wherein the cap rail creates a step for accessing the carrier when the hinged section is in an open position.

* * * * *